United States Patent [19]
Gazeley

[11] 3,956,217
[45] May 11, 1976

[54] LATEX SETTING MATERIALS

[75] Inventor: Keith Frederick Gazeley, Welwyn Garden City, England

[73] Assignee: The Malaysian Rubber Producers Research Association, England

[22] Filed: May 29, 1974

[21] Appl. No.: 474,443

[30] Foreign Application Priority Data
June 1, 1973  United Kingdom............... 26377/73

[52] U.S. Cl................... 260/29.7 NR; 260/29.7 NE; 260/29.7 E; 260/29.7 UA; 260/726; 260/739; 260/759; 260/767; 260/874; 260/877; 260/878 R; 260/879; 260/880 R; 260/885; 260/886; 260/889

[51] Int. Cl.²...................... C08L 9/08; C08L 13/02

[58] Field of Search.............. 260/29.7 UP, 29.7 SE, 260/29.7 PT, 29.7 NE, 29.7 W, 29.7 R, 29.7 DP, 29.7 NR, 29.7 AT, 29.7 E, 874, 877, 878, 879, 880, 885, 886, 892, 739, 726, 759, 767

[56] References Cited
OTHER PUBLICATIONS

Blackley, *High Polymer Latices*, I, pp. 35–44, 402–404, (Applied Science, 1966).

*Primary Examiner*—John C. Bleutge
*Assistant Examiner*—T. Debenedictis, Sr.
*Attorney, Agent, or Firm*—Wenderoth, Lind & Ponack

[57] ABSTRACT

Self-setting products, having utility in sealing pipe-joints, are made by mixing a latex of natural or synthetic rubber and a sensitising agent therefor with a copolymerizable unsaturated organic monomer, and initiating polymerisation of the monomer for example by means of a redox catalyst syatem so as to gel the latex and cause the product to set.

8 Claims, No Drawings

LATEX SETTING MATERIALS

This invention is concerned with a method for preparing latex based self-setting materials which may be poured into place and allowed to set in situ.

Such materials may be prepared by conventional processes. For instance, a hydrolysable material such as sodium silicofluoride may be added to the latex in suitable quantity so that within a short time the pH of the latex is reduced and the latex gels. Alternatively, a sensitising agent such as a zinc ammonium salt may be added to the latex which will set when the temperature is raised.

These techniques have certain disadvantages.

i. The working life of the fluid material is relatively short as is the case when using $Na_2SiF_6$.

ii. Problems of external heating and even distribution of heat arise in the case of heat sensitised materials.

iii. Certain types of synthetic polymer latex are not easy to gel by one or both of these methods.

iv. It is very difficult to produce a strong bond between the set materials and a substrate.

It is the purpose of the invention to provide a method which does not suffer from these disadvantages.

The present invention provides a method of making a set product which method comprises providing a fluid composition comprising:

a latex of a natural or synthetic rubber, from 20 to 200 pphr by weight of a polymerisable ethylenically unsaturated organic material, a sensitising agent for the rubber latex, the composition comprising not more than 50% by weight of water, and initiating polymerisation of the polymerisable unsaturated organic material so as to cause the composition to form a set product.

Polymerisation of the organic material may be initiated by the introduction of free radicals into the composition. Free radicals may be generated by a catalyst system in the composition or by external energy, e.g. UV radiation or a radioactive source. The setting of the composition occurs as a result of the polymerisation of the organic material.

The latex may be natural or synthetic, saturated or unsaturated rubber or blend of two or more rubbers. Suitable rubber latices include those of natural, polychloroprene, styrene-butadiene, carboxylated styrene-butadiene, synthetic polyisoprene, acrylonitrile-butadiene, and butyl rubbers. Natural rubber latex is preferred. We prefer to use latex having a solids content of at least 30% by weight, for example, 60% or even more by weight. An upper limit on the solids content of the rubber latex is set only by the fact that the composition must be fluid.

The unsaturated organic material is preferably a monomer which will polymerise by a free radical process in the presence of the latex. It may be advantageous if the monomer is one which forms a graft polymer with the latex rubber. Suitable monomers include styrene and acrylic monomers, e.g. methyl and ethyl acrylate and methacrylate. Methyl methacrylate is the preferred monomer, though butyl acrylate is useful when more flexible products are required. It may be advantageous to use blends of these monomers.

A minor proportion of a di- or poly-unsaturated monomer or polymer, for example, an unsaturated polyester, may be included to stiffen the set product.

On the whole, the polymerised monomer tends to harden the set product, so that the more monomer used, the harder the set product will be. This applies particularly where the glass transition point of the polymerising monomer is above ambient temperature. Amounts less than 20 pphr of monomer may be insufficient to gel the rubber latex or to significantly alter the properties of the set product from those of the gelled rubber latex. Ammounts of monomer above 200 pphr may result in set products which are too hard or rigid or which lack flexibility. We prefer to use from 40 to 120 pphr of monomer.

The catalyst system when used is one capable of generating free radicals which will initiate polymerisation of the monomer preferably at ambient temperature. A redox system is convenient, although other radical producing systems may be used. Suitable systems are well known to the art and their nature is not critical to the invention, although they do to some extent affect the properties of the product. One such known redox system comprises an organic peroxide or hydroperoxide and an activator, e.g. tetraethylene pentamine. The presence of a small quantity of iron salt is necessary for this system and is often present in the original latex as an impurity; if not it can be added. The amount of the catalyst system needs to be sufficient to initiate polymerisation of the monomer within a desired time interval; indeed the proportions of the two components of a redox system can usefully be chosen to control the setting time of the aqueous composition. Exemplary ranges are likely to be: organic peroxide 0.3%, to 3.0%; polyamine 0.05% to 0.5%, both by weight on the weight of the monomer. The setting time may also be controlled by variation of the amount of iron. When using a redox system of this type with natural rubber latex, it may be necessary to have present at least 3 ppm of iron, and we prefer to use from 10 ppm to 100 ppm or more, depending on the desired setting time.

At normal latex pH 9.8 to 10.5, the activity of the peroxide/amine system is very sensitive to the iron content of the latex and natural variation in the latex can cause inconveniently rapid setting times. Better control is established at pH 7.5 when it is necessary to use a larger quantity of iron and the natural iron content of the latex is proportionately less significant. A disadvantage of the lower pH is that it has been found to give rise to lower bond strengths with silane based primers when compared with those obtained at the higher pH.

An activator which appears relatively insensitive to normal variation of iron content is sodium formaldehyde sulphoxylate (SFS). At latex pH 9.8 to 10.5 it becomes relatively inactive at temperatures much below 20°C. Sodium bisulphite has been used at temperatures down to 0°C.

Exemplary ranges are for SFS, 0.1 to 1.0%, typically 0.3%, by weight on the weight of the latex, and for sodium bisulphite 0.1 to 1.0%.

The effect of activator on setting time is more critically dependent on its concentration for bisulphite and less so for SFS.

The sensitising agent for the rubber latex should be one which does not interfere with the redox catalyst; zinc ammonium salts and similar components may not be suitable with some redox systems for this reason. Suitable sensitising agents include polyoxyalkylene diols and polyvinyl methyl ethers, both of which classes of materials are known as heat sensitisers for rubber latex, although gelation of the aqueous composition may occur in their presence at temperatures little above room temperature.

It may be advantageous to incorporate into the aqueous composition a proportion of a plasticiser or extender. Such plasticisers or extenders may be particularly useful when a relatively large amount of monomer is being used, to provide a set product having adequate flexibility, particularly when the monomer concerned forms a polymer with a glass transition point above ambient temperature. Known plasticisers and extenders for this purpose are likely to be suitable, for example, with natural rubber, light mineral oils and processing oils comprising principally saturated hydrocarbons.

It has been found that such plasticisers or extenders can have a sensitising effect on the rubber latex, so that they can be used in partial or complete replacement of the sensitisers, particularly in cases where the proportion of monomer to rubber latex is relatively large. Thus, for example, with as little as 40 pphr by weight of methyl methacrylate, the presence of a polyoxyalkylene diol or similar heat sensitiser is likely to be required to gel the rubber latex. But with larger amounts, e.g. as much as 120 pphr, by weight of methyl methacrylate, a light mineral oil could be used in partial or complete replacement of the polyoxyalkylene diol.

The amount of sensitiser (e.g. polyoxyalkylene diol) used will frequently be in the range of 2 to 20 pphr by weight. When used, the amount of plasticiser or extender will frequently be up to 100% of the weight of the monomer, but may be more, for example, from 10 to 200 pphr by weight.

It will normally be necessary to incorporate a surfactant to emulsify the monomer and to prevent coagulation of the latex during mixing. The surfactant is preferably non-ionic although certain types of anionic surfactants may be used. It should in any case not interfere with the gelation process.

Where the set product is in contact with metal surfaces, particularly ferrous metal surfaces, it will be advantageous to incorporate a material to inhibit corrosion of the metal due to the water content of the product. Sodium nitrite at 0.4 to 1.0% by weight on the weight of the latex has been found effective for mild steel surfaces.

For some end-uses, particularly use underground, it will be necessary to incorporate a fungicide and/or bactericide. The material chosen should be one which does not interfere with the polymerisation reaction. A chlorinated hydrocarbon exemplified by Cereclor 42 may be used for this purpose.

Typical antioxidants for rubber may interfere with the polymerisation reaction. The degree of interference may depend on the catalyst system used. Antioxidants which have been used without major interference are 2,2'-methylene-bis-[4-ethyl-6-t-butyl-phenol], phenylcyclohexyl-p-phenylene-diamine, phenol condensation product (Nonox WSP) and polymerised 2,2,4,-trimethyl-1,2-dihydroquinoline (Flectol H). Some increase in catalyst concentration may be necessary.

The pH of the aqueous composition may vary over a wide range. Using natural rubber, the pH is generally between 7.0 and 12.0, and may conveniently be around 10, i.e. the pH of the natural rubber latex itself. It may be possible to control the rate of free radical production, and hence the rate of setting, by altering the pH.

This invention is concerned with aqueous compositions of high solids content at least 50% by weight non-aqueous which solidify rapidly, e.g. in less than 6 hours, preferably within 2 hours, at ambient temperature, to form a coherent set product. When ambient temperatures are low, for example 0°C, setting may take a longer time, but will normally be complete within 24 hours. The term "ambient temperature" is intended to imply the absence of externally applied heat; internally generated heat, caused by polymerisation of the monomer and other chemical reactions, raises the temperature of the composition above that of its surroundings.

The various ingredients described above can be supplied for use in the form of a two-component package. The two parts of the redox system need to be in different comonents; the surfactant will normally be added to the latex; the latex and the monomer are generally in different components; the rubber latex on the one hand, and the sensitiser and the peroxide part of the redox system on the other, are preferably kept apart to reduce the risk of the prmature coagulation of the latex. Subject to these criteria, the two components may be made up as desired, for example, thus: (parts and percent are by weight):

| | |
|---|---|
| Component A | |
| Natural or synthetic rubber latex | 100 |
| Surfactant (when used) | 1.5 to 15 |
| Activator part of redox system | 0.05 to 3.0 |
| pH adjusting agent | as required |
| Iron in water-soluble form | at least 3ppm |
| Component B | |
| Monomer | 20 to 200 pphr |
| Plasticiser or extender | 0 to 200pphr (or 10 to 200pphr if the sensitising agent is absent) |
| Peroxide part of redox system | 0.3% to 5% of monomer |
| Sensitising agent for rubber latex | 0 to 20 pphr (or 2 to 20 pphr if the plasticiser/extender is absent). |

Alternatively, the plasticiser or extender may be included in Component A instead of Component B (if it is used at all, which it need not be if a sensitising agent for the rubber latex is provided).

One use for the set products produced according to this invention is seals for leaking joints in gas mains. Many joints in gas mains in the United Kingdom are leaking because the change to natural gas has led to shrinkage of the joint seals. There has been developed a process for the encapsulation of the leaking joints by surrounding them with a flexible mould and injecting into it a self-setting sealing material. Flexibility of the set product, to tolerate relative movement between adjacent sections of piping, is one necessary characteristic of the set material; strong adhesion to the substrate is another; low cost is yet another. The products of this invention are, or can be, suitable on all three counts.

In comparison with the use of rubber latex, the method of the present invention offers the following advantages:

a. the use of a monomer permits control of the setting time of the aqueous composition and of the properties (e.g. hardness, flexibility) of the set product, b. by the use of suitable primers, it is possible to bond the set products of this invention to certain substrates.

Other uses of the compositions of the invention are in the manufacture of flexible moulds and moulded objects where flexibility, rapid setting and low costs are at a premium; and in the manufacture of flooring materials.

The following Examples illustrate the invention. Parts and percentages are all by weight. In the Examples, certain materials are identified by Trade Names.

Solumin FP 300 is a solution of a surface active agent of the alkylphenolpolyether sulphate type sold by ABM Chemicals Ltd.

Empicol LX 28 is a solution of sodium lauryl sulphate sold by Albright and Wilson Ltd.

The polyoxyalkylene diol is similar to the materials described in British Patent No. 757,310. The particular example used has a cloud point of 35° to 40°C.

Commercial t-butyl hydroperoxide was used having a nominal hydroperoxide content of 80%.

Edilex 27 is a light mineral oil.

Natural Rubber latex (LA1) is a low ammonia latex (0.2% ammonia) preserved with sodium pentachlorophenate.

In Examples 1 to 3 the material was in the form of two liquid components, part A based on the latex and part B based on the monomer. The two parts were then mixed together. The mixtures were prepared with the materials added in the order shown.

EXAMPLE 1

Part A

| | |
|---|---|
| Polychloroprene latex (Trade Name Neoprene 750) | 100 |
| Solumin FP 300 | 6 |
| Empicol LX28 | 1 |
| Tetraethylene pentamine | 0.2 |
| 20% solution of acetic acid (to give pH 7.5) | 5 |
| 0.1% solution of iron (as ferrous ammonium sulphate) | 1.5 |

Part B

| | |
|---|---|
| Methyl methacrylate monomer | 69 |
| Dibutylphthalate | 34 |
| Polyoxyalkylene diol | 5.2 |
| t-butyl hydroperoxide | 0.7 |

Part B was mixed with Part A until the emulsion was formed. Gelation started nineteen minutes after mixing at a temperature of 50°C. The mixture reached a maximum of 70°C and formed a firm set material.

EXAMPLE 2

Part A

| | |
|---|---|
| Styrene-Butadiene latex (Intex 100) | 100 |
| Solumin FP 300 | 6 |
| Empicol LX28 | 1 |
| Tetraethylene pentamine (5%aq sol$^n$.) | 1.2 |
| Water | 20 |

Part B

| | |
|---|---|
| Methylmetharcylate monomer | 80 |
| Edilex 27 | 40 |
| Polyoxyalkylene diol | 6 |
| t-butyl hydroperoxide | 0.8 |

Part B was added to Part A with stirring which was continued to emulsify the monomer mixture. The mixture started to gel 22 minutes after mixing at a temperature of 28°C. The material finally set to a firm solid and the maximum temperature reached was 60°C.

EXAMPLE 3

Part A

| | |
|---|---|
| 60% Natural Rubber Latex (LA1) | 100 |
| Solumin FP300 | 6 |
| Empicol LX28 | 1 |
| Tetraethylene pentamine (10 aq. solution) | 2 |
| 0.1% solution of iron (as ferrous amm. sulphate) | 5 |
| Acetic acid (20%aq. solution) to pH 7.5 | 3.9 |

Part B

| | |
|---|---|
| Methylmethacrylate monomer | 84 |
| Edilex 27 | 42 |
| Polyoxyalkylene diol | 6.2 |
| t-butyl hydroperoxide | 0.8 |

Part B was added to Part A with stirring to emulsify the monomer mixture. The onset of gelation occurred 38 minutes after mixing at a temperature of 25°C. The polymerisation reaction continued to give a firm tough product. The maximum temperature reached during the reaction was 65°C.

EXAMPLE 4

In this Example the complete mixture was prepared with the exception of one component which was added later as an activator.

Part A

| | |
|---|---|
| (La1 type) 60% Natural rubber latex | 100 |
| FP300 | 6 |
| Solumin | |
| Empicol LX28 | 1 |
| Water | 8 |

Part B

| | |
|---|---|
| Methyl methacrylate monomer | 60 |
| Edilex | 40 |
| Polyoxyalkylene diol | 6 |
| t-butyl hydroperoxide | 0.8 |

Part B was added to Part A with stirring. The mixture was left for 1½ hours and then the reaction was activated by the addition of 2.0 parts of a 5% aqueous solution of tetraethylene pentamine.

Gelation commenced after five minutes at 25°C, setting to a rubbery mass. The maximum temperature was 60°C.

EXAMPLE 5

This Example illustrates the use of mineral oil as the sensitiser.

Part A

| | |
|---|---|
| 60% Natural Rubber latex (LA1) | 100 |
| Solumin FP 300 | 6 |
| Empicol LX28 | 1 |
| Tetraethylene pentamine (10% aqueous solution) | 1.5 |
| 0.1% solution of iron (as ferrous ammonium sulphate) | 2.5 |
| 20% acetic acid to pH 7.5 | 3.7 |

Part B

| | |
|---|---|
| Methylmethacrylate monomer | 40 |
| Edilex 27 | 40 |
| t-butyl hydroperoxide | 0.4 |

Part B was added with stirring to 29 gm of Part A. The mixture started to gel 30 minutes after mixing, at a temperature of 24°C. The material set to a firm flexible solid and the maximum temperature reached was 38°C.

EXAMPLE 6

In this Example the composition of Example 3 was used to form a seal between two mild steel test pieces. The test pieces were in the form of right angles with 2 inch sides and a 1 inch wide face. The faces of the metal were primed with a silane bonding agent sold by Union Carbide Corporation under the designation A-174. The silane was applied as a 5% solution in ethyl alcohol. After allowing to dry for 15 minutes at room temperature the gap between two parallel faces of the test pieces was filled with the fluid composition of Example 3 which was then allowed to set. The example was tested 24 hours later by pulling on the free faces of the test pieces. Adhesive failure occurred at a load of 40 Kgms.

A similar test piece prepared without the use of a primer was easily pulled apart by hand showing a low level of adhesion.

EXAMPLE 7

| Part A | |
|---|---|
| 60% Natural rubber latex (high ammonia) | 100 |
| Solumin FP300 | 10 |
| Oil (Edilex 27) | 30 |
| Cereclor 42 | 6 |
| 10% Sodium nitrite | 4 |
| 20% Sodium formaldehyde sulphoxylate sol. | 1.5 |
| 10% Sodium bisulphite solution | 4.5 |
| Part B | |
| Methyl methacrylate monomer | 30 |
| Polyester resin (Crystic 196) | 10 |
| Polyoxyalkylene diol | 6 |
| t-butyl hydroperoxide | 0.8 |

Part B was added to Part A with stirring and placed between metal test pieces as in Example 6. At ambient temperature of 20°C the sealant set in 19 minutes.

A similar experiment was performed using the above composition with the omission of the sodium nitrite.

Corrosion patches developed on the unprotected sample within a few days. For the sample containing sodium nitrite, there were no signs of corrosion after several weeks.

EXAMPLE 8

The composition of Example 7 was prepared but was kept in an ambient temperature of 0°C. A gradual gelation occurred between 3 and 5 hours after mixing and a full set had occurred by 20 hours.

In a repeat experiment at an ambient temperature of 10°C gelation started after 41 minutes.

EXAMPLE 9

| Part A | |
|---|---|
| Carboxylated SBR latex | 100 |
| Solumin FP 300 | 10 |
| Edilex 27 oil | 40 |
| 10% tetraethylene pentamine solution | 2 |
| 0.1% solution of iron (as ferrous ammonium sulphate) | 4 |
| Part B | |
| Methyl methacrylate | 50 |
| Unsaturated polyester prepolymer | 17 |
| Polypropylene glycol | 10 |
| t-butyl hydroperoxide | 1.3 |

Part B was added to Part A with stirring at a temperature of 23°C.

The mixture gelled in 30 minutes setting to a firm but rather brittle product.

EXAMPLE 10

| Part A | |
|---|---|
| 60% natural rubber latex (type LA 1) | 100 |
| Solumin FP 300 | 10 |
| Naphthenic oil | 20 |
| Tetra-ethylene pentamine | 1 |
| 0.1% solution of iron (as ferrous ammonium sulphate) | 2 |
| Part B | |
| Styrene | 60 |
| Polypropylene glycol | 6 |
| Cumene hydroperoxide | 1.6 |

Part B was added to Part A with stirring at ambient temperature of 23°C. The mixture gelled in 25 minutes at a temperature of 50°C and set to s soft, fexible solid.

EXAMPLE 11

| Part A | |
|---|---|
| 60% natural rubber latex (type LA 1) | 100 |
| Solumin FP 300 | 10 |
| 20% sodium formaldehyde sulphoxylate solution | 1.5 |
| 10% Sodium bisphulphite solution | 5.0 |
| Part B | |
| n-butyl acrylate | 30 |
| Unsaturated polyester prepolymer | 10 |
| Polypropylene glycol | 6 |
| t-butyl hydroperoxide | 0.8 |

Part B was added to Part A with stirring, at a temperature of 23°C. The mixture gelled in 18 minutes setting to a flexible solid.

We claim:
1. A method of making a set product, which method comprises:
   a. providing a fluid composition comprising:
   a latex of natural or synthetic rubber,
   from 1.5 to 15 pphr by weight of a stabilizer for the latex,
   from 20 to 200 pphr by weight of a polymerizable ethylenically unsaturated organic material comprising at least one monomer which will polymerize in the presence of the latex, selected from styrene and acrylic and methacrylic monomers,
   from 2 to 20 pphr by weight of a heat sensitizer for the latex selected from the group consisting of polyoxyalkylene diols and polyvinyl methyl ethers,
   the composition containing not more than 50% by weight of water, and
   b. initiating polymerization of the polymerizable unsaturated organic material at ambient temperature so as to cause the composition to form a set product.

2. A method as claimed in claim 1, wherein the polymerisable unsaturated organic material includes a minor proportion of an unsaturated polyester resin to stiffen the set product.

3. A method as claimed in claim 1, wherein polymerisation of the polymerisable unsaturated organic material is initiated by incorporating a catalyst system in the fluid composition.

4. A method as claimed in claim 3, wherein the catalyst system is a redox catalyst system comprising an organic peroxide or hydroperoxide and activator selected from the group consisting of tetraethylene pentamine, sodium formaldehyde sulphoxylate, sodium bissulphite, potassium bissulphite and mixtures thereof.

5. A method as claimed in claim 1, wherein the fluid composition includes an amount of 10 to 200 pphr by weight of a plasticiser or extender for the rubber selected from the group consisting of light mineral oils and principally saturated hydrocarbons.

6. A method of making a set product, which method comprises:
   a. providing a fluid composition comprising:
   a latex of natural or synthetic rubber,
   from 1.5 to 15 pphr by weight of a stabilizer for the latex,
   from 20 to 200 pphr by weight of a polymerizable ehtylenically unsaturated organic material comprising at least one monomer which will polymerize in the presence of the latex, selected from styrene and acrylic and methacrylic monomers,
   from 10 to 200 pphr by weight of a plasticizer or extender for the rubber selected from the group consisting of light mineral oils and processing oils comprising principally saturated hydrocarbons,
   the composition containing not more than 50% by weight of water, and
   b. initiating polymerization of the polymerizable unsaturated organic material at ambient temperature so as to cause the composition to form a set product.

7. A two-component mixture consisting of Components A and B, in which:

| Component A contains | |
|---|---|
| (in part by weight unless otherwise stated): | |
| Natural or synthetic rubber latex | 100 |
| Surfactant | 1.5 to 15 |
| Activator part of redox catalyst system | 0.05 to 3.0 |
| Component B contains | |
| Styrene or acrylic monomer | 20 to 200 pphr |
| Plasticiser or extender selected from the group consisting of light mineral oils and principally saturated hydrocarbons | 0. to 200 pphr |
| Peroxide part of redox catalyst system | 0.3% to 5.0% of monomer |
| Heat sensitizer for rubber latex selected from the group consisting of polyoxyalkylene diols and polyvinyl methyl ethers | 0 to 20 pphr |

Components A and B being formulated to provide, on mixing, a fluid composition containing not more than 50% by weight of water which gels in not more than 24 hours after mixing at ambient temperature to form a coherent set product.

8. A two component mixture consisting of Components A and B, in which:

| Component A contains | |
|---|---|
| (in parts by weight unless otherwise stated) | |
| Natural or synthetic rubber latex | 100 |
| Surfactant | 1.5 to 15 |
| Activator part of redox catalyst system | 0.05 to 3.0 |
| Plasticiser or extender selected from the group consisting of light mineral oils and principally saturated hydrocarbons | 0. to 200 pphr |
| Component B contains | |
| Styrene or acrylic monomer | 20 to 200 pphr |
| Peroxide part of redox catalyst system | 0.3% to 5% of monomer |
| Sensitising agent for rubber latex selected from the group consisting of polyoxyalkylene diols and polyvinyl methyl ethers | 0 to 20 pphr |

Components A and B being formulated to provide, on mixing, a fluid composition containing not more than 50% by weight of water which gels in not more than 24 hours after mixing to form a coherent set product.

* * * * *